| United States Patent [19] | [11] | 4,394,411 |
|---|---|---|
| Krüll et al. | [45] | Jul. 19, 1983 |

[54] STRUCTURAL PANEL OF GYPSUM WITH TEXTILE CASING AND METHOD FOR PRODUCING SAME

[75] Inventors: Manfred Krüll, Heiligkreuzsteinach; Udo Lobert, Neuenburg; Dieter Stamm, Heidelberg; Klaus Veeser, Müllheim, all of Fed. Rep. of Germany

[73] Assignee: Firma Carl Freudenberg, Weinheim an der Bergstrasse, Fed. Rep. of Germany

[21] Appl. No.: 355,698

[22] Filed: Mar. 8, 1982

[30] Foreign Application Priority Data

Apr. 4, 1981 [DE] Fed. Rep. of Germany ....... 3113682

[51] Int. Cl.³ .......................... B32B 1/04; B32B 31/18
[52] U.S. Cl. ........................................ 428/70; 428/76; 428/212; 428/218; 428/284; 428/285; 428/286; 428/287; 428/288; 428/703

[58] Field of Search ................... 428/70, 76, 212, 218, 428/247, 255, 284, 285, 287, 288, 703

[56] References Cited

U.S. PATENT DOCUMENTS 3,964,944 6/1976 Gwynne ................................ 428/70

Primary Examiner—Marion McCamish
Attorney, Agent, or Firm—Kenyon & Kenyon

[57] ABSTRACT

Structural panel of gypsum and an envelope, partly impressed therein, of a bonded mineral and/or fiberglass fabric which has on the inside facing the gypsum larger pores than on the outside, the fabric containing at least two kinds of fibers which are cemented together by a bonding agent, where the fibers with the larger diameter are arranged on the inside and the bonding agent contains 30 to 85 percent by weight aluminum, iron and/or silicon hydroxide.

8 Claims, No Drawings

STRUCTURAL PANEL OF GYPSUM WITH TEXTILE CASING AND METHOD FOR PRODUCING SAME

BACKGROUND OF THE INVENTION

The present invention relates to a structural panel of gypsum and an enclosure impressed therein of a bonded mineral and/or fiberglass fabric which has larger pores on the inside facing the gypsum than on the outside.

A structural panel of the type mentioned above is known from the German Utility Pat. No. DE-GM 78 06 114. The fabric layer is reinforced on the inside by a woven fiberglass fabric or arrangement, and the fabric layer thereby exhibits anisotropic strength properties which are transferred to the overall structural panel.

Due to the method of manufacture, the dimensional stability of structural panels of the type shown in the German Patent is largely based on the fact that the envelope or enclosure used can be trimmed off precisely along a predetermined line. This requirement is often very difficult to meet if an envelope with an embedded fiber arrangement of fabric of relatively coarse structure is used.

In order to obtain improved embedment of the glass fibers of the enclosure into the gypsum paste, reference is made in the mentioned German Patent to first spraying the inside of the envelope or enclosure with a wetting agent. The fibers and the gypsum of such a structural panel are thus joined together exclusively in a form-locking manner, which precludes the achievement of even greater strength.

SUMMARY OF THE INVENTION

It is an object of the present invention to develop a structural panel which can be produced in facilities customary for the production of gypsum board sheet and which is distinguished by improved bending strength.

This and other objects are achieved by the provision of a structural panel of gypsum having an enclosure of a mineral and/or fiberglass fabric impressed therein which has larger pores on the inside facing the gypsum than on the outside, and wherein the fabric enclosure comprises at least two kinds of fibers which are cemented together by a bonding agent containing from about 30 to 85 percent by weight (of the binder) of aluminum, iron and/or silicon hydroxide, and wherein the fibers with the larger diameter are arranged on the inside facing the gypsum.

The enclosure of the structural panel according to the present invention may consist of a bonded fabric having isotropic strength properties, and thereby exhibit a mechanical strength which is independent of the direction. The fabric material of the enclosure contains at least two kinds of fibers, the fibers of larger diameter being arranged on the inside and all fibers being cemented together by a bonding agent which contains 30 to 85 percent aluminum, iron and/or silicon hydroxide, referred to the weight of the bonding agent.

To obtain particularly high strength in a preferred direction, for example, in the longitudinal direction, it is possible to embed threads into the fabric, which threads are oriented in the direction of interest. The threads can be inserted during the fabrication, for example, by permitting the threads to run in between the individual nap layers forming the bonded fabric. It is also possible to apply the threads, in the form of a family of threads, to the inside of the bonded fabric and to cement the threads to the fabric, for example, during the subsequent impregnation. The mutual spacing of the threads should be about 5 to 20 mm with a diameter of 30 to 150 dtex. In this manner, the structural element of the present invention can be used, for example, as support material in building construction.

The bonding agent may be any inorganic or organic substance capable of joining the fibers of the fabric together to form a unit. The fabric is thereby made dimensionally stable and can, if desired, be produced in an operation separate from the fabrication of the overall structural panel. The fabric also can be transported in wound form, for example, on a roll, to a location where the structural panel is manufactured.

The bonding agent contains aluminum, iron and/or silicon hydroxide. During the setting of the gypsum paste (applied in liquid form) in the presence of the bonding agent, the formation of chemical bridges results by which the strength of the bond between the enclosure and the gypsum core of the structural panel is substantially increased, particularly with respect to the bending strength.

The bonded fabric can be built up of fibers having a greatly varying diameter, for example, fibers having some statistically varied diameter, which leads to great strength. The larger diameter fibers should not exceed 10 to 50 μm, and should at the same time correspond to about 1.5 to 5 times the smallest fiber diameter. It has been found that it is of great advantage if the relatively thicker fibers have at the same time a relatively greater length than the other fibers. In order to obtain a high degree of uniformity in the fiber direction, however, the length of the thicker fibers should not exceed about 5 to 12 mm and, at the same time, should correspond to about 1.5 to 5 times the value of the corresponding length of the relatively finest fibers. The fibers are mixed together and are deposited so that within the fabric, the coarser-fiber content decreases from the inside to the outside. The inside is thereby characterized by a relatively coarse pore structure which permits easy penetration of the gypsum paste applied in liquid form and thereby ensures good bonding of the enclosure. Undesired penetration and contamination of the required manufacturing facilities resulting therefrom is prevented by the relatively fine pore structure of the outside of the enclosures. The open-surface content is designed so that no vapor pressure can develop in the interior of the structural panel during drying or during later use.

The bonding agent content should be from about 50 to 200 percent, referred to the weight of the fibers. The bonding agent should enclosure the fibers on the entire surface if possible, and the absolute content of bonding agent increases in accordance with the relatively increasing surface of increasing fine fibers in the direction toward the outside. In addition, depending on the wettability of the fibers, a bonding agent accumulation and so-called sail formation of bonding agent at the fiber crossings can result in the bonding agent is applied in liquid form, which accumulation contributes substantially to the strengthening and bonding into the gypsum paste. If the fibers are packed particularly densely, the accumulation of bonding agent also can lead to the formation of bridges between non-directly crossing and mutually touching fibers and thus to a clogging-up of the pores which were originally surrounded by the fibers. A corresponding thick fiber deposit is obtainable without difficulty on the outside and prevents fouling of the machine by the gypsum paste poured on the inside of the fabric. In this case a further advantage is obtained from the possibility of modifying the surface properties of the structural panel with respect to special stresses and giving the panel, for example, particularly good abrasion resistance, water resistance and fire resistance. In addition an ideal adhesion base is obtained for subsequent coatings and sealings which make possible the use of an accordingly equipped structural panel outdoors or in areas in which aggressive media are encountered.

In addition to the properties noted above, aluminum, iron and silicon hydroxide have good flame protection properties which is of great importance with respect to compliance with existing fire prevention regulations. These regulations also can be met if an organic and optionally, an elastic, substance is used as the bonding agent proper, for example, a binding agent with an acrylic acid dispersion base.

In the earlier-mentioned German Utility Pat. No. 78 06 114, a method for producing a structural panel is described in which the gypsum paste is formed on the fabric which is provided in the longitudinal direction with upright lateral edges, is covered with another fabric, is formed into an envelope and is dried. As already explained above, exclusively mechanical anchoring of the inside fibers of the fabric in the gypsum paste is obtained in this method. To this extent, the strength of the bond obtained is insufficient. In accordance with the present invention, the shortcomings of the foregoing process are remedied by the provision of a method for manufacturing a structural panel wherein the gypsum paste is formed on a bonded fabric (according to the present invention) provided with lateral upright edges in the longitudinal direction, the gypsum paste is covered by a further fabric (according to the present invention) which is then formed into an envelope, and the panel then heated at the surfaces, at least briefly, to a temperature of 100° C. to 180° C., preferably 100° C. to 120° C.

In this method, therefore, the fabric used according to the invention must have been treated in a preceding operation with a bonding agent adhering to the fibers, which has a content of 30 to 85 percent of aluminum, iron and/or silicon hydroxide. To this fabric, the gypsum paste, which is made into a pasty compound with water, is applied in a manner known per se and is spread out, using known techniques, and pressed into the pores of the fabric which are open toward the inside. The forming of an envelope with a cover fabric follows according to well-known procedures.

Through the spontaneous heating-up of the surface to a temperature of 100° to 180° C., and preferably to a temperature of 100° to 120° C., at least part of the water required for the setting of the gypsum is apparently taken in this range not from the gypsum paste, but from the iron and/or aluminum and/or silicon hydrate, and is absorbed. The bond obtained has high mechanical strength and is supplemented by the bonding agent in the direction of the fibers. The fracture line, when separated by force, is always at a distance from the surface of the fibers.

DETAILED DESCRIPTION OF THE INVENTION

The invention is described in further detail with the aid of the following examples.

EXAMPLE 1

A wet-bonded fabric of two layers having the same weight, with a fiber content of 100 g/m$^2$ is reinforced by impregnation with a bonding agent. The upper of the two layers consisted of 80 parts glass fibers with a diameter of 9 μm and a length of 13 mm, and 20 parts of glass fibers with a diameter of 16 μm and a length of 26 mm. The lower of the two layers contained, in addition to 80 parts glass fibers with a diameter of 16 μm and a length of 26 mm, 20 parts glass fibers with a diameter of 9 μm and a length of 13 mm. In both layers, the fibers were distributed randomly, i.e., were assembled without a preferred directional orientation.

For reinforcement, a bonding agent was contained therein which contained 84 parts aluminum hydroxide in addition to 16 parts acrylic-acid ester. The wet fabric provided with the bonding agent had an area weight of 280 g/m$^2$. On the underside, the fabric showed a substantially coarser core structure than on the top side. The gypsum paste, applied in a relatively watery form, was thereby capable of penetrating very well into the interior of the wet fabric without, however, penetrating in the direction of the top side. The proposed wet fabric can thereby be used with excellent results on the customary production lines for manufacturing gypsum board sheet. Similar processes are described, for example, by Hanusch "Gips-kartonplatten" (Gypsum Board Sheet), published by Rudolf Mueller, Koeln-Braunsfeld, 1978. Accordingly, the wet fabric is applied to the facility with the coarsely structured underside pointing up and is coated with the gypsum paste. A second corresponding wet fabric is pressed immediately afterwards into the paste with the coarse-structured underside, so that the gypsum paste can penetrate also on this side into the pores which are open toward the bottom, and can envelop the fibers.

After the gypsum paste has set, a sample is taken from the structural panel obtained. The panel, with a thickness of 15 mm, has a breaking load as per DIN 18 180 of 614 N. This corresponds to a breaking moment of 92.1 Nm/400 mm sample width.

In a control test, a similar test piece was prepared wherein the wet fabric material, instead of an aluminum hydroxide content, had the same content of chalk. The breaking load as per DIN 18 180 was 330 N. This corresponds to a breaking moment of 49.5 Nm/400 mm sample width. A comparison of the breaking loads of 640 N and 330 N shows an improvement of the bending stiffness of 86 percent.

EXAMPLE 2

Using the fiber compositions from Example 1, a fiberglass fabric with an area weight of 90 g/m$^2$ was formed. The fabric was reinforced by impregnation with a bonding agent which contained 20 percent formaldehyde urea and 80 percent iron hydroxide. The finished weight was 252 g/m$^2$. The corresponding breaking load of a test piece with a thickness of 15 mm was 554 N as per DIN 18 180. This corresponds to a breaking moment of 83.1 Nm/400 mm.

In a control test, the same fiberglass fabric was bonded with a similar impregnation mixture, but the iron hydroxide content was replaced by the same content of chalk. The breaking load was determined to be 280 Nm, which corresponded to a breaking moment of 42 Nm for a sample width of 400 mm.

The use of iron hydroxide thus results in an improvement of the strength properties of 98 percent over the case with the same content of chalk.

EXAMPLE 3

Using the fiber compositions from Example 1, a fiberglass fabric with an area weight of 80 g/m² is formed by a dry process. The fabric is impregnated with a solution of an elastomer polyurethane with a content of silicon hydroxide and is solidified. The finished weight was 224 g/m², of which 18 percent was the polyurethane and 82 percent silicon hydroxide, as referred to the bonding agent content.

According to the procedures in Example 1, the bonded fabric was worked into a structural panel. A sample with a thickness of 15 mm taken therefrom showed a breaking load of 512 N in the tensile tests as per DIN 18 180; this corresponds to a breaking moment of 76.8 Nm for a sample width of 400 mm.

For comparison a similar sample was made in which the silicon hydroxide was replaced by the same content of chalk. In this case the breaking load was 385 N, which corresponds to a breaking moment of 57.8 Nm for a sample width of 400 mm. In this case an improvement of the mechanical properties of 33 percent was obtained by the embedment of silicon hydroxide.

EXAMPLE 4

Using the same fiber compositions as in Example 1, a fiberglass fabric with an area weight of 120 g/m² was formed by a wet process. This fabric was internally stabilized by spraying-in a bonding agent with a formaldehyde base, and subsequently solidified with a bonding agent which was composed of 25 percent of acrylic-acid ester and 75 percent of aluminum hydroxide. The finished weight was 336 g/m². After processing into a structural panel according to Example 1 with a thickness of 15 mm, a test specimen was taken and tested under the conditions described in DIN 18 180. A breaking load of 693 Nm was found, which corresponds to a breaking moment of 104 Nm/400 mm.

In a control test, a similar structural panel was made, the cover fabric of which, instead of the aluminum hydroxide, had the same content of chalk. A value of 367 N was determined as the breaking load, which corresponded to a breaking moment of 55 Nm/400 mm. An improvement of the mechanical properties by 89 percent is thus obtained through the embedment of aluminum hydroxide in the bonding agent.

What is claimed is:

1. A structural panel comprising gypsum within an enclosure of a mineral and/or fiberglass fabric impressed therein, said fabric having larger pores on the inside facing said gypsum and containing at least two kinds of fibers, with fibers on the inside of the fabric facing the gypsum being of relatively larger diameter than the other fibers in the fabric, and said fibers of said fabric being cemented together by a bonding agent containing from about 30 to about 85 percent by weight, referred to the weight of the bonding agent, of a hydroxide of aluminum, iron and/or silicon.

2. A structural panel according to claim 1 wherein the diameter of the largest fibers is from about 10 to 50 μm and corresponds to 1.5 to 5 times the value of the smallest fiber diameter.

3. A structural panel according to claim 1 wherein the length of the fibers increases with increasing diameter and the longest fiber length is from about 5 to 12 mm, and is from about 1.5 to 5 times the value of the length of the shortest fibers.

4. A structural panel according to claim 1 wherein the fibers are mixed together and the content of coarse fibers steadily decreases from the inside facing the gypsum in the direction toward the outside.

5. A structural panel according to claim 1 wherein the content of bonding agent, referred to the weight of the fibers, is from about 50 to 200 percent.

6. A structural panel according to claim 5 wherein the absolute content of bonding agent in the fabric increases in the direction toward the outside.

7. A structural panel according to claim 1 wherein said bonding agent comprises an organic substance having elastic properties.

8. A method for manufacturing a structural panel, comprising:
   (a) providing a bonded fabric comprised of at least two kinds of mineral and/or fiberglass fibers bonded with a bonding agent containing from about 30 to 85% by weight, referred to said bonding agent, of a hydroxide of aluminum, iron and/or silicon, said fabric having larger pores on a surface thereof and being provided with lateral upright edges in the longitudinal direction;
   (b) applying a gypsum paste to the side of the fabric having said larger pores;
   (c) applying to said gypsum a bonded fabric as in step (a), with the surface of said fabric having larger pores facing said gypsum, to form an enclosure of bonded fabric around said gypsum; and
   (d) heating the surfaces of the so-obtained structural panel for a short time at a temperature of from about 100° C. to about 180° C.

* * * * *